United States Patent
Berghof et al.

[11] 3,966,253
[45] June 29, 1976

[54] VEHICLE SEAT WITH TILTABLE BACKREST

[75] Inventors: Hans-Joachim Berghof, Remscheid-Hasten; Hans-Gerd Hackländer; Gerd Klingelhofer, both of Remscheid, all of Germany

[73] Assignee: Keiper KG, Remscheid-Hasten, Germany

[22] Filed: Apr. 28, 1975

[21] Appl. No.: 572,300

[30] Foreign Application Priority Data
Apr. 30, 1974 Germany.............................. 15117

[52] U.S. Cl.............................. 297/367; 297/373
[51] Int. Cl.².................. A47C 1/026; B60N 1/06
[58] Field of Search............ 297/354, 355, 366–371, 297/378, 379; 16/146

[56] References Cited
UNITED STATES PATENTS

| | | | |
|---|---|---|---|
| 2,784,770 | 3/1957 | Herr.................................. | 297/367 |
| 3,001,821 | 9/1961 | Marechal........................ | 297/379 X |
| 3,309,139 | 3/1967 | Turner et al....................... | 297/367 |
| 3,788,698 | 1/1974 | Perkins............................ | 297/367 X |

FOREIGN PATENTS OR APPLICATIONS

| | | | |
|---|---|---|---|
| 1,414,700 | 9/1965 | France.............................. | 297/366 |
| 2,108,624 | 8/1972 | Germany.......................... | 297/366 |
| 2,162,954 | 7/1972 | Germany.......................... | 297/379 |

Primary Examiner—Roy D. Frazier
Assistant Examiner—William E. Lyddane
Attorney, Agent, or Firm—Michael J. Striker

[57] ABSTRACT

A pair of hinge fittings is mounted at opposite lateral sides of the seat. Each fitting includes a first strap that is fixedly connected with the seat member and a second strap that is fixedly connected with the back member. A pivot connects the straps of each for relative pivotal movement. One strap of each fitting carries an arcuate gear segment and the other strap carries an engaging member which is permanently biased into engagement with the respective gear segment by a biasing spring. A control arrangement is provided which permits the engaging member to be moved out of contact with the respective gear segments. This control arrangement includes on each fitting a pivotal first arm that can be moved into and out of engagement with the respective engaging member and, when it is in such engagement, prevents the engaging member from moving out of engagement with the gear segment. A pivotable second arm is also provided on each fitting, as well as pivotable third arm which is coupled with the second arm, and a link which couples the three arms for joint movement. A connecting member connects the third arms of both fittings for simultaneous movement, and a single handle is provided at one of the fittings and is effective for turning the second arm thereof, such movement being transmitted to the second arm of the other fitting, and resulting in movement of the first arms of both fittings out of engagement with the respective engaging members so that the same can move out of contact with the gear segments.

10 Claims, 4 Drawing Figures

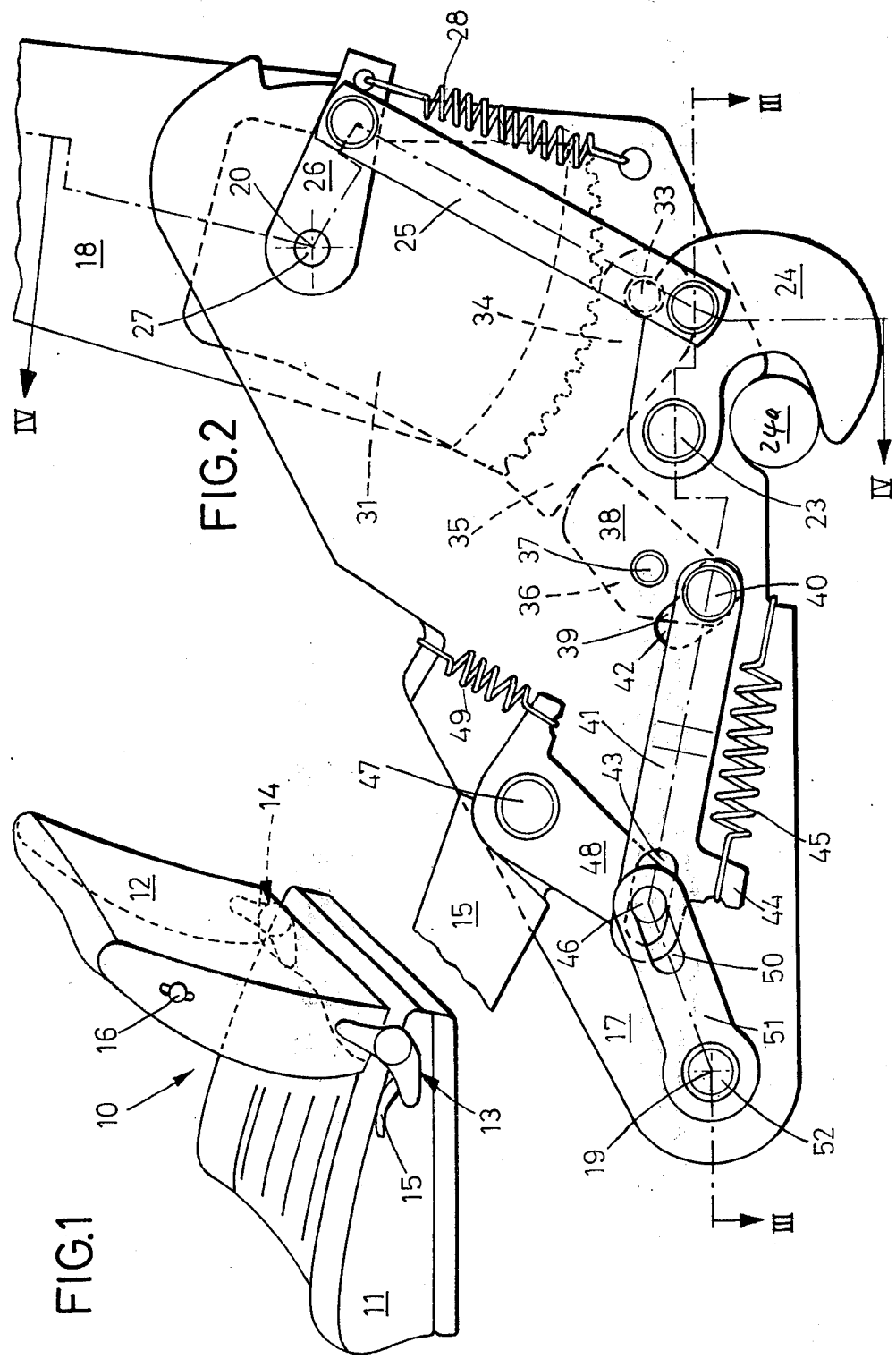

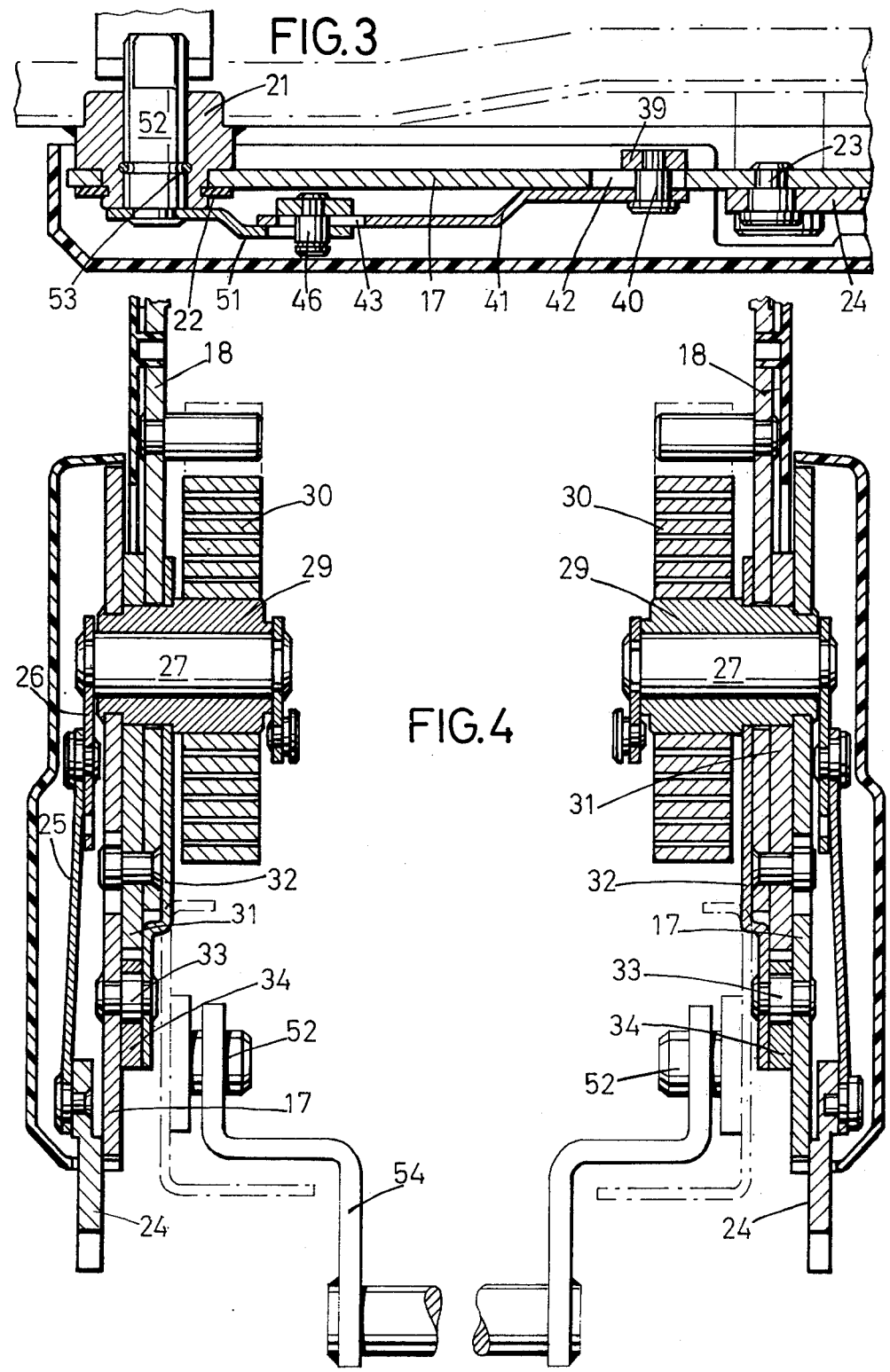

VEHICLE SEAT WITH TILTABLE BACKREST

BACKGROUND OF THE INVENTION

The present invention relates generally to a seat construction, and more particularly to a seat of the type having a backrest member that can be tilted with reference to the seat member. The invention is suitable especially, but not exclusively, for use with seats of automotive vehicles.

It is already known to provide automobile seats with fittings which permit the backrest member of the seat to be tilted forwardly or rearwardly with respect to the seat member. Fittings of this type must meet various requirements, some of which are contradictory. On the one hand, such fittings must be absolutely reliable in operation, and must have great strength and durability even under exceptionally high stresses and under disadvantageous operating conditions where they will receive, as a general rule, little or no attention or maintenance. On the other hand, they must be inexpensive to produce and should be small so as to require only a minimum of space.

The prior-art fittings of this type do not meet all of these requirements, or not to the necessary extent, because they require a great number of components which must cooperate with one another. This means not only unacceptable susceptibility to malfunction, but also rather bulky constructions. Moreover, if these many components are to cooperate with one another properly, the components must be manufactured to very precise tolerances which in turn increases the manufacturing expense.

SUMMARY OF THE INVENTION

Accordingly, it is a general object of this invention to provide an improved construction of the type in question, which is not possessed of the prior-art disadvantages.

More particularly, it is an object of the present invention to provide improved hinge fittings in an adjustable seat of the type outlined earlier, which hinge fittings require only a relatively small number of components.

An additional object of the invention is to provide such hinge fittings wherein the components can be produced simply and their manufacturing and installation tolerances are not critical, so that the production and installation of the hinge fitting is inexpensive.

In keeping with these objects, and with others which will become apparent hereafter, one feature of the invention resides in a seat, particularly a vehicle seat, which briefly stated comprises a combination of a pair of hinge fittings at opposite lateral sides of the seat and each including a first strap fixedly connected with the seat member of the seat, a second strap fixedly connected with the backrest member of the seat, a pivot connecting the straps for relative pivotal movement, an arcuate gear segment on one of the straps, an engaging member on the other strap and movable into engagement with the gear segment for preventing the pivotal movement, and biasing spring means biasing the engaging member into engagement with the gear segment. Control means is provided for moving the engaging members of both hinge fittings simultaneously out of engagement with the respective gear segments. This control means includes on each fitting a pivotal first arm movable to and from a location in which it abuts the respective engaging member and prevents the same from moving out of engagement with the respective gear segment, a pivotal second arm, a pivotal third arm coupled with the second arm and a link coupling the arms for joint movement. Furthermore, the control means includes a connecting member which connects the third arms of both fittings for simultaneous movement, and a handle for effecting movement of one of the second arms so that this movement is transmitted via the connecting member to the second arm of the other fitting.

This construction requires a comparatively small number of components for each hinge fitting, and the components need not be manufactured to particularly precise tolerances, nor is the performance of the components influenced if the tolerances change, for example as a result of wear in use. Moreover, each hinge fitting is rather small in size, due to the small number of components involved, and the space requirements for its installation are therefore minor. In addition, the hinge fitting according to the present invention is and remains over a long period of time very reliable, even under disadvantageous conditions, i.e. when the fitting receives no maintenance for prolonged time periods.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view illustrating a seat, and in this embodiment a motor vehicle seat, provided with hinge fittings of the present invention;

FIG. 2 is a partly broken-away enlarged-scale detail view showing details of one of the hinge fittings in a side view, with cover members omitted for the sake of clarity;

FIG. 3 is a section on line III—III of FIG. 4, with one of the cover members illustrated; and FIG. 4 is a section taken on line IV—IV of FIG. 2, showing both of the cover members in place.

DESCRIPTION OF THE PREFERRED EMBODIMENTS

Referring to FIGS. 1–4 it will be seen that the invention is illustrated on hand of a motor vehicle seat 10, although it could also be employed in other types of seats. The seat 10 has a seat member 11 and a backrest member 12. The members 11 and 12 are connected with one another so that the member 12 can be tilted forwardly or backwardly with reference to the seat member 11. For this purpose two hinge fittings 13 and 14 are provided, each located at one of the lateral sides of the seat 10. The degree of inclination of the back member 12 relative to the seat member 11 can be varied via the hinge fittings 13 and 14 by operation thereof, for which purpose the operating handle 15 is employed. As will be seen with reference to FIGS. 2–4, the hinge fittings 13 and 14 are so connected that the operation of the single handle 15 is sufficient to operate both of the hinge fittings 13 and 14 simultaneously in a sense disengaging them to permit the tilting of the seat back member 12 to a selected position in which it is thereupon arrested. In this embodiment the seat back member 12 is further provided with a knob or button 16 which, when operated, disengages an arresting device that permits the seat back member 12 to be folded forwardly onto the seat member 11, together with the hinge fittings 13 and 14 which do not change their illustrated geometry but which pivot relative to the seat member 11 together with the seat back member 12. This measure is used in two-door automobiles to permit easier ingress or egress of passengers from the rear seat. This is a measure which is known in the art and no attempt will be made to describe the operation of the arrangement which is actuated by the knob 16.

The construction of the hinge fittings 13 and 14 is identical, except that they are arranged mirror-symmetrically with reference to one another. It will therefore suffice to describe only a single one of the fittings, since it will be understood that the other fitting is constructed and operates identically. FIGS. 2–4 show the details of such a fitting.

Each fitting 13 or 14 has a first strap 17 which is to be connected to the seat member 11 and a second strap 18 which is to be connected to the seat back member 12. The straps 17 and 18 are advantageously of sheet metal and may be stamped. The straps 18 are fixedly connected to the seat back member 12, for example by means of screws (not illustrated) whereas the straps 17 are connected to the seat member 11 so that they can pivot about a pivot axis 19 upon disengagement of the arresting device which is operated by the knob 16. As indicated before, when this movement takes place, the geometry of each fitting 13, 14, i.e. the relative orientation of the straps 17 and 18 thereof, remains unchanged and the fitting moves together with the seat back member 12 about the pivot axis 19.

For the purpose of adjusting the inclination of the seat back member 12 relative to the seat member 11, however, the straps 17 and 18 of each hinge fitting 13, 14 can tilt about a further pivot axis 20.

In the illustrated embodiment the pivot axis 19 is defined by bushings 21, one for each fitting 13, 14 which are located at opposite lateral sides of the seat 10 so as to be in axial alignment with one another. These bushings are mounted in a support member of the seat 10. The straps 17 are pivotally mounted on portions of the bushings 21, being confined between a shoulder of the respective bushing and a circlip 22 mounted on the bushing. Mounted on each of the straps 17, by means of a pin 23, is a hook 24 which can pivot about the pin 23 and which is coupled via a link 25 with an arm 26 that is mounted on a shaft 27 of the respective fitting. The other end of the shaft 27 which is spaced from the arm 26 carries a further arm (not shown) which is engageable by the not illustrated unlatching mechanism that is operated by the knob 16.

A helical spring 28 is connected to the arm 26 and to the strap 17 and biases the arm 26 in such a manner that it urges the hook 24 into engagement with an abutment member 24a that is mounted on a portion of the structure of the seat 10. As long as the hook 24 engages the abutment member 24a, a pivoting of the seat 10 about the pivot axis 19 is prevented. When the arms 26 are pivoted in counterclockwise direction about the pivot axis 20, as a result of the operation of the knob 16, they pivot the hooks 24 of the respective fittings 13, 14 in similar counterclockwise direction about the pivot axes of the respective pins 23 out of engagement with the abutment members 24a, so that the seat back member 12 with the two fittings 13, 14 can now be pivoted (towards the left in FIG. 1) towards or onto the seat member 11, to permit ingress or egress of passengers from the rear seat of a vehicle.

As FIG. 4 shows, the shafts 27 of each fitting 13, 14 are journalled in a bushing 29 which defines the pivot axis 20. These bushings 29 are non-rotatably mounted on the respective straps 17, for example by having a portion of polygonal cross section which extends into an opening of the strap 17 that is also of polygonal cross section. The straps 18 are turnably mounted on the bushings 29, and the latter also engage the inner ends of coil springs 30 whose outer ends engage the respective straps 18 and are so stressed that they permanently tend to tilt the seat back member 12 forwardly (i.e. towards the left in FIG. 1) in order to facilitate such displacement when the knob 16 is operated.

Mounted on each of the straps 18, for example by riveting or welding (riveting is shown in the drawing) is a gear segment 31 which is located between the strap 17 and the cooperating strap 18 of the respective fitting 13, 14. The set of teeth of the gear segment 31 is arcuately curved on a radius which is concentric to the pivot axis 20. The inwardly directed surface of the respective strap 17 abuts the gear segment 31, whereas a supporting plate 32 which is connected with the strap 17 by means of rivets, engages the inwardly facing side of the strap 18. A pivot 33 connects the plate 32 with the strap 17 in a location remote from the strap 18 and the gear segment 31, so as not to interfere with them (compare FIG. 4) and a pawl 34 is pivotally mounted on this pivot 33, having a head 35 which is formed with a curved set of teeth, the arc of curvature being shorter than that of the gear segment 31; these teeth engage with the teeth of the gear segment 31. When they are in such engagement, any tilting of the strap 18 relative to the strap 17 is precluded.

The pawl 34, 35 is urged into and maintained in engagement of its teeth with those of the gear segment 31 by means of a pivotal supporting arm or lever 36 which is turnably mounted on a pivot 37 provided on the strap 17. The lever 36 has one portion 38 that is formed with an engagement surface (compare FIG. 2) that can engage the head 35 of the pawl 34 and is curved on a radius of curvature which is eccentric with reference to the pivot axis defined by the pivot 37. The other portion 39 of the lever 36 is connected with a link 41 by means of a pin 40, so that the link 41 can turn with reference to the portion 39. The pin 40 extends through a slot-shaped opening 42 which is formed in the strap 17 and which is slightly arcuately curved. The pawl 34 and the lever 36 will thus be seen to be mounted approximately at the same level on the strap 17 and are able to withstand any forces acting upon them to an optimum extent. A lateral yielding of the pawl 34 (i.e. in direction normal to the plane of FIG. 2), is prevented by the strap 17 and the supporting plate 32, respectively.

The link 41 is formed in its end portion that is spaced from the pivot 40, i.e. the left-hand end portion in FIG. 2, with an elongated opening 43. In this region it is also provided with a nose 44 which engages one end of a helical spring 45 the other end of which is hooked behind a step on (or otherwise secured to) the strap 17. This biasing action is transmitted via the link 41 to the lever 36. A pin 46 is provided on an arm 48 and extends through the opening 43; the arm 48 in turn is mounted turnably on a pivot 47 that is fixedly secured on the strap 17. A further biasing spring 49 engages the arm 48 and is also connected to the strap 17, so as to have the permanent tendency of pivoting the arm 48 in counterclockwise direction about the pivot 47. The pin 46 extends not only through the opening 43, but also through a further elongated opening 50 which is formed in an end portion of another arm 51 that is mounted on a pivot 52 to rotate with but not relative to the same. The pivot 52 is received in the earlier-mentioned bushing 21 in which it can turn, and thus defines the pivot axis 19. Each of the pivots is retained in its requisite axial position by a spring ring 53 which is in part lodged in a groove formed in the inner circumferential surface of the bushing in which the pivot 52 is received, and in part in a similar outer circumferential groove formed in the pin 52 itself. The two pins 52, i.e. the pin 52 of the fitting 13 and the pin 52 of the fitting 14, are connected by a connecting member 54 in such a manner that they can turn only in unison, i.e. when one of the pins 52 turns, this motion is transmitted via the connecting member 54 to the other pin 52 which then turns simultaneously and in the same sense. The connecting member 54 may be of one piece or of a plurality of pieces (as shown in FIG. 4) and it may (as also shown) be repeatedly offset.

The starting position of the components of the fitting 13 is shown in FIG. 2, i.e. the position which the components assume before any attempt is made to operate the fitting so as to permit tilting of the seat back member 12 with reference to the seat member 11. The components of the other fitting 14 will be in the same relative positions at this time, but of course the fitting 14 does not have the handle 15. In the position of FIG. 2 the pawl 34 engages the teeth of the segment 31 and is maintained in the selected position by engagement of the lever 36 with the pawl 34, since due to the free movement of the pivot 46 in the hole 43 the lever 36 is biased under the influence of the spring 45 into tight engagement with the pawl 34. This engagement, incidentally, can take place independently in the two fittings 13, 14, since the two levers 36 thereof are not coupled so as to be constrained to perform movements in unison. The arms 48, however, will always be in identical starting positions which is determined, for example, by enagement of the pivot 46 against that end of the opening 50 that faces away from the pivot axis 19.

If, with the fittings in the starting position that is shown by way of example for the fitting 13 in FIG. 2, it is desired to change the inclination of the seat back member 12 with reference to the seat member 11, the user grasps the handle 15 (compare FIGS. 1 and 2) and pulls up on it, thereby displacing it in clockwise direction in FIG. 2. This causes both of the arms 48 to be moved in clockwise direction via the arms 51, the pivots 52 and the connecting member 54. This motion of the arms 48 is transmitted via the projections 46 to the links 41 which effect pivoting of the levers 36 about the pivots 37 in counterclockwise direction. The pawls 34 are therefore no longer supported in engagement with the teeth of the gear segments 31, so that they can either pivot out of such engagement under the influence of gravity or they will become disengaged for another reason, for example due to a component of force that acts upon them and tends to move them out of engagement with the teeth of the gear segments 31. In any case, once the engagement is terminated the seat back member 12 with its two straps 18 can now be pivoted or tilted relative to the seat member 11 either in forward direction (which movement is facilitated by the biasing action of the springs 30 which become tensioned when the seat back member is moved to upright position or is tilted rearwardly), or in rearward direction which can permit a user to recline on the seat 10. Once the desired orientation of the seat back member 12 is reached, the user disengages the handle 15 and the springs 45 and 49 cause the levers 36 to be returned to their positions shown in FIG. 2, via the links 41 and the arms 48. The levers 36 then push with their curved abutment faces against the respective pawls 34 and urge the teeth thereof into engagement with the teeth of the cooperating gear segments 31. This blocking function or arresting function is independent in each fitting of the respective other fitting, since the links 41 have sufficient freedom of movement relative to the projections 46 so that an engagement of the teeth of the pawl 34 with the teeth of the gear segment 31 can take place in one fitting even though in the other fitting the cooperating teeth of the gear segment 31 and pawl 34 are so located (tip-to-tip) that they cannot move into engagement.

Because of the construction and cooperation of the individual components in each fitting 13, 14 as described before, it will be evident that the manufacturing tolerances for producing the components can be very relaxed and the manufacture of the components is therefore quite inexpensive. Having the springs 45 directly engage links 41 is not only a space-saving solution, but also a solution which is inexpensive because it eliminates any need for additional components and nevertheless achieves a reliable biasing of the levers 36. Although it is preferred to have the gear segments 31 located as shown in FIG. 4, that is between the cooperating straps 17 and 18 of the respective fitting 13 or 14, different solutions are also possible and are fully encompassed within the meaning and intent of the present invention. The members which are shown as beng of synthetic plastic material in FIG. 4 are cover members which are not absolutely necessary, but which can be provided to protect the mechanism of the fittings 13, 14 against damage or the excessively free access of contaminants, and which further have the purpose of providing an aesthetically pleasing appearance as is customary in the automobile industry especially.

It will be understood that each of the elements described above, or two or more together, may also find a useful application in other types of constructions differing from the types described above.

While the invention has been illustrated and described as embodied in a seat construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a seat, particularly a vehicle seat, a combination comprising a pair of hinge fittings at opposite lateral sides of the seat and each including a first strap fixedly connected with the seat member of the seat, a second strap fixedly connected with the backrest member of the seat, a pivot connecting the respective first and second straps for relative pivotal movement, a gear segment on one of the straps of each of said pairs of straps, an engaging member on the respective other strap of each of said pairs of said straps and movable into engagement with the respective gear segments for preventing said pivotal movement, and biasing means biasing said engaging members into engagement with the respective gear segments; and control means for substantially simultaneously moving the engaging members of both of said hinge fittings out of engagement with the respective gear segments, said control means including on said other strap of each fitting a pivotally mounted first arm movable to and from a location in which it abuts the respective engaging member and prevents the same from moving out of engagement with the respective gear segment, a pivotally mounted second arm, a pivotally mounted third arm coupled with said second arm, the respective second and third arms being directly coupled with one another and with one end of a link by a coupling portion, the other end of said link being coupled to the respective first arm for joint movement of all said arms, and said control means further including a connecting member connecting the third arms of both fittings for substantially simultaneous movement, said control means also including a handle for effecting movement of one of said second arms so that such movement is transmitted to the other second arm via said connecting member.

2. A combination as defined in claim 1, wherein the link and third arm of each fitting are provided with respective registering elongated openings and the respective coupling portion comprises a projection provided on the respective second arm and extending into and slidable in the registering openings.

3. A combination as defined in claim 1, wherein said biasing means includes a pair of springs each of which has an end connected with said other strap of the respective fitting and each of which has another end connected with the respective link so as to bias the respective link.

4. A combination as defined in claim 1, comprising a bushing mounted in each of said fittings and a pivot turnably journalled in each of said bushings; and wherein said connecting member connects said pivots for joint turning movement.

5. A combination as defined in claim 4, and comprising spring retaining means retaining said pivots in the respective bushings against axial displacement therein.

6. A combination as defined in claim 5, wherein the coupling portion comprises a projection provided on each of said second arms, and said one end of each respective link and the respective third arm both engage the respective projection.

7. A combination as defined in claim 1, each first strap having a side which faces the second strap of the same fitting, and each gear segment being provided on said side of the respective first strap.

8. A combination as defined in claim 7, wherein each first strap is formed with a cut-out and said links are each connected with the respective first arms by a pivot extending through said cutout of the respective first strap.

9. A combination as defined in claim 1, wherein at least one of said gear segments is arcuate.

10. A combination as defined in claim 1, wherein said biasing means includes spring means.

* * * * *